United States Patent
Huckey et al.

(10) Patent No.: US 10,427,376 B2
(45) Date of Patent: Oct. 1, 2019

(54) ERGONOMIC PUNCTURE-RESISTANT PADS

(71) Applicant: The Boeing Company, Chicago, IL (US)

(72) Inventors: Andrew Michael Huckey, Charleston, SC (US); Craig A. Charlton, Charleston, SC (US); Mark Edward Nestleroad, Charleston, SC (US); Jake Aspen Wilson, Charleston, SC (US)

(73) Assignee: The Boeing Company, Chicago, IL (US)

( * ) Notice: Subject to any disclaimer, the term of this patent is extended or adjusted under 35 U.S.C. 154(b) by 406 days.

(21) Appl. No.: 15/372,223

(22) Filed: Dec. 7, 2016

(65) Prior Publication Data

US 2018/0153308 A1    Jun. 7, 2018

(51) Int. Cl.
| | |
|---|---|
| *F16F 3/00* | (2006.01) |
| *B32B 3/26* | (2006.01) |
| *B32B 5/02* | (2006.01) |
| *A41D 13/06* | (2006.01) |

(52) U.S. Cl.
CPC ............... *B32B 3/26* (2013.01); *B32B 5/024* (2013.01); *B32B 2307/546* (2013.01); *B32B 2437/00* (2013.01); *B32B 2571/00* (2013.01)

(58) Field of Classification Search
CPC .......... A41D 13/065; B32B 5/024; B32B 3/26
USPC ........ 248/636, 638; 2/2.5, 24; 267/145, 152, 267/153
See application file for complete search history.

(56) References Cited

U.S. PATENT DOCUMENTS

| | | | | |
|---|---|---|---|---|
| 5,881,395 A | * | 3/1999 | Donzis | A41D 13/0153 2/455 |
| 6,709,729 B2 | * | 3/2004 | Baruch | A01K 13/006 428/101 |
| 7,882,568 B2 | * | 2/2011 | Fee | A41D 13/065 2/24 |
| 8,434,748 B1 | * | 5/2013 | Pearce | B68G 5/00 267/142 |
| 8,479,314 B2 | * | 7/2013 | Colanto | A41D 13/065 2/24 |

(Continued)

OTHER PUBLICATIONS

Legion Safety OK-1 Gel Knee Support Pads KP-GEL, retrieved from http://www.legionsafety.com/ok-1-gel-knee-support-pads-kp-gel.html, on Jan. 10, 2017, 2 pages.

(Continued)

*Primary Examiner* — Christopher P Schwartz
(74) *Attorney, Agent, or Firm* — Hanley, Flight & Zimmerman, LLC

(57) ABSTRACT

Ergonomic puncture-resistant pads are disclosed. An example disclosed herein includes a first layer configured to be adjacent a person and to conform to the person; a second layer coupled to the first layer, the second layer configured to resist puncture; and a third layer coupled to the second layer, the third layer including a flexible support structure extending away from the second layer, the third layer configured to support the person and to conform to a shape of a surface supporting the person, the flexible support structure configured to contact the surface, the flexible support structure including cavities to receive at least one object protruding from the surface to isolate the person from the at least one protruding object.

20 Claims, 6 Drawing Sheets

(56) References Cited

U.S. PATENT DOCUMENTS

| | | | |
|---|---|---|---|
| 8,490,213 B2* | 7/2013 | Neal | F41H 5/0471 |
| | | | 2/2.5 |
| 2002/0096811 A1* | 7/2002 | Callsen | A47C 9/027 |
| | | | 267/145 |
| 2006/0041986 A1* | 3/2006 | Godshaw | A41D 13/0568 |
| | | | 2/24 |
| 2010/0080971 A1* | 4/2010 | Neal | F41H 5/0471 |
| | | | 428/213 |
| 2010/0183847 A1* | 7/2010 | Pearce | B32B 3/28 |
| | | | 428/158 |
| 2016/0242479 A1* | 8/2016 | Berns | A41D 13/0506 |
| 2016/0327113 A1* | 11/2016 | Shelley | A41D 13/0158 |
| 2017/0245651 A1* | 8/2017 | Yeung | A47C 27/00 |

OTHER PUBLICATIONS

GELTEC Comb-Gel Series, retrieved from http://www.geltec.com.tw/modules/smartsection/category.php?categoryid=6, on Jan. 10, 2017, 8 pages.

Google Search Results for "honeycomb gel pad," [https://www.google.com/search?q=honeycomb+gel+pad&biw=1406&bih=829&source=lnms&tbm=isch&sa=X&ved=0ahUKEwjTt4Wk5s3OAhUUWWMKHc1HCo42_AUIBygC&dpr=0.9], retrieved on Jan. 10, 2017, 2 pages.

Google Search Results for "punctureproof gel pad," [https://www.google.com/search?q=punctureproof+gel+pad&biw=1406&bih=829&source=lnms&tbm=isch&sa=X&ved=0ahUKEwjTkqra4s3OAhUM1WMKHfMACP4Q_AUIBygC&dpr=0.9#tbm=isch&q=honeycomb+core+gel+pad], retrieved on Jan. 10, 2017, 2 pages.

* cited by examiner

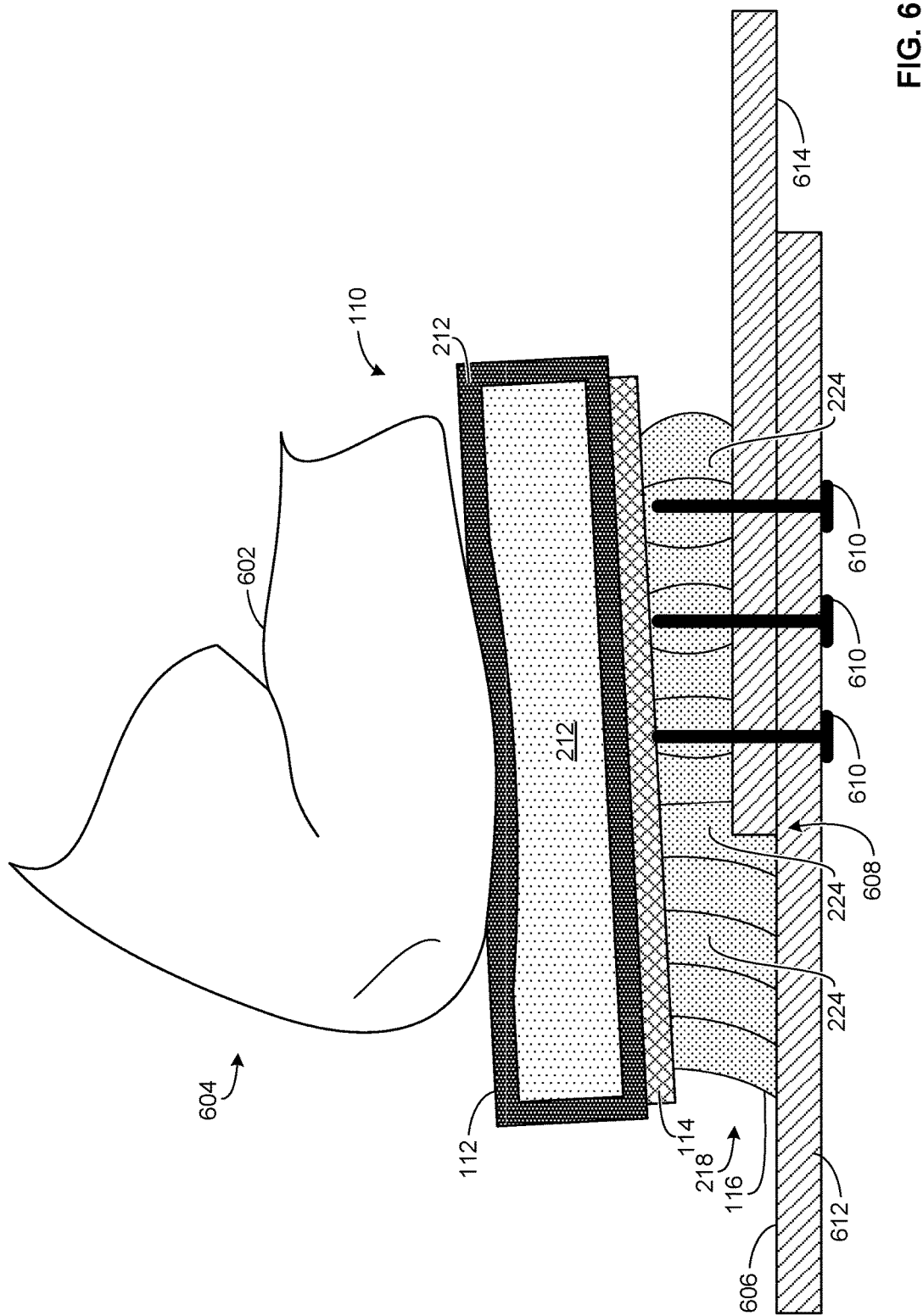

ERGONOMIC PUNCTURE-RESISTANT PADS

FIELD OF THE DISCLOSURE

This disclosure relates generally to safety devices and, more particularly, to ergonomic puncture-resistant pads.

BACKGROUND

Protective pads are often used in manufacturing plants or work areas to protect workers from deleterious surfaces (e.g., hot, abrasive, sharp, hard, etc.). Protective pads typically include a cushioning layer (e.g., foam, batting, felt, etc.) and/or a shielding layer (e.g., plastic, leather, metallic armor, etc.) that are disposed between the deleterious surface and the worker. The cushioning layer is typically adjacent the worker to provide comfort as the worker comes into contact with the deleterious surface. The shielding layer typically provides a robust barrier between the worker and the deleterious surface.

In certain service applications such as, for example, in the construction, automotive, and aerospace industries, workers crawl across or kneel on deleterious surfaces. For example, workers may kneel on sections of a structure held together with protruding temporary fasteners (e.g., nails, bolts, wedge lock pins, etc.) while welding the sections together.

Therefore, in certain service applications involving deleterious surfaces with protruding objects, protective pads are often employed by workers kneeling on the deleterious surfaces. Although resistant to larger diameter protruding objects (e.g., bolts), such protective pads may nonetheless be punctured by some protruding objects (e.g., nails, wedge lock pins). Further, such protective pads may engage the protruding objects in a manner that produces an uncomfortable surface for the worker. These known protective pads, in addition to not preventing discomfort, may further fail to prevent damage to fasteners (e.g., wedge pin fasteners, clamps, etc.). At least one known protective pad is composed of foam (e.g., ethylene-vinyl acetate (EVA), polyethylene-vinyl acetate (PEVA), etc.) through which protruding objects can puncture or form uncomfortable bumps.

SUMMARY

In one example, an apparatus includes a first layer configured to be adjacent a person and to conform to the person; a second layer coupled to the first layer, the second layer configured to resist puncture; and a third layer coupled to the second layer, the third layer including a flexible support structure extending away from the second layer, the third layer configured to support the person and to conform to a shape of a surface supporting the person, the flexible support structure configured to contact the surface, the flexible support structure including cavities to receive at least one object protruding from the surface to isolate the person from the at least one protruding object.

In another example, an apparatus includes a pad having a resilient layer to face a surface supporting a person using the pad, the resilient layer including a gel configured to receive at least one object protruding from the surface, the gel exposed on the outer layer without an intervening layer between the gel and the at least one object protruding from the surface.

In another example, a method for making a knee pad includes coupling an elastomeric matrix of cells to a shielding layer; and coupling a cushioning layer to the shielding layer.

BRIEF DESCRIPTION OF THE DRAWINGS

FIG. 6 is a cross-sectional view of an example pad described herein in use.

Figure 1:
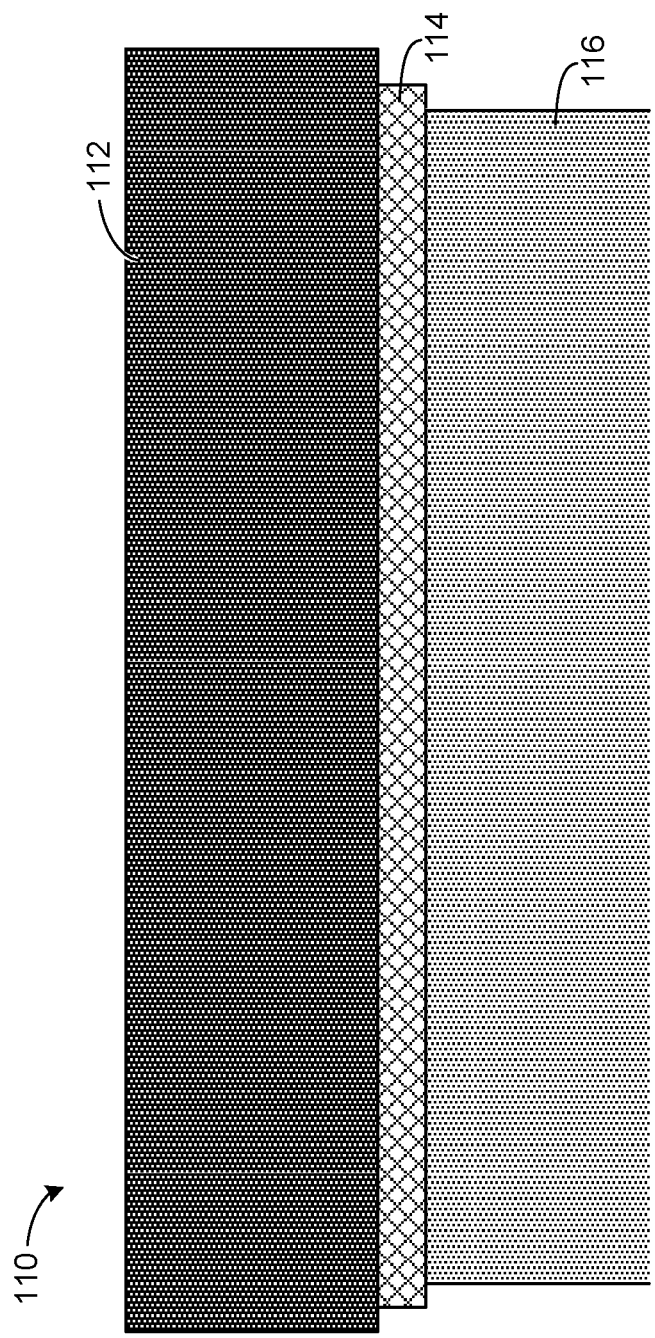
FIG. 1 is a side view of an example pad described herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is distanced from the other part with one or more intermediate part(s) located therebetween. Stating that any part is in contact with another part means that there is no intermediate part between the two parts.

DETAILED DESCRIPTION

In general, the example ergonomic puncture-resistant pads described herein may be used with deleterious surfaces having protruding objects to provide comfort and protection to persons (e.g., workers) kneeling or crawling on these surfaces. The example pads described herein provide significantly increased protection and comfort for workers, and increased prevention of damage to fasteners and/or other objects that may be protruding from surfaces supporting the workers, as compared to at least some known pads. Thus, the example pads described herein may, for example, be advantageously used in the manufacture of aircraft, land vehicles, watercraft, etc.

Example pads described herein are composed of multiple layers that cooperate to protect and increase the comfort of persons (e.g., workers) kneeling, crawling or otherwise engaging with uneven surfaces and/or surfaces having protruding objects. Unlike the above-mentioned known pads, example pads described herein employ a lower resilient layer that flexibly conforms to uneven surfaces and that includes spaces or cavities between portions of a flexible support structure that can receive objects protruding from these surfaces. More specifically, the resilient layer may provide a flexible support structure that contacts a surface on which a person using the pad is supported. The flexible support structure is composed of a resilient material (e.g., an elastomer) that can support a person using the pad at a distance above the surface while flexibly conforming to the shape of the surface, thereby increasing the comfort of the person by isolating the person from any uneven characteristics of the surface. Further, the flexible support structure provides a standoff distance between the person and the surface supporting the person such that objects (e.g., fasteners) protruding from the surface into spaces or cavities of the flexible support structure do not extend beyond the depths of the spaces or cavities, thereby preventing the protruding objects from contacting the person and isolating the person from the protruding objects. In other words, the person is effectively supported by the flexible support structure above upper ends of the protruding objects to prevent the person from experiencing discomfort that might otherwise result from contact between the protruding objects and the person. Additionally, by isolating the protruding objects within the cavities of the support structure in this manner, damage to the objects (e.g., in the case where the objects are fasteners) may be prevented.

In examples described herein, the flexible support structure may be formed to provide posts, fingers or walls having ends that contact surfaces on which the examples pads are being used. The portions or features of the flexible support structure are sized and shaped to provide the above-noted flexible conformance to uneven surfaces and standoff distance, while at the same maximizing the footprint of the spaces or cavities defined by the flexible support structure. In this manner, the likelihood of an object protruding from a surface on which the pad is being used engaging with the flexible support structure is minimized or, put another way, the likelihood of protruding objects being received by the cavities or spaces of the flexible support structure is maximized. In some examples, this objective is achieved by forming the flexible support structure as a matrix of cells. In these examples, the interlinking of the portions of the flexible support structure via shared cell walls enables relatively thin walls to be used while maintaining the resiliency needed to provide the standoff distance as noted above.

In examples where the support structure defines a matrix of cells, the spaces or cavities between the cell walls may be filled with a flowable or self-healing gel. In these examples, the gel may be bonded to the cell walls. This enables relatively thinner walls to be used (i.e., compared to examples that do not employ the gel) while maintaining the resiliency of the resilient layer needed to conform to uneven surfaces and provide the desired standoff distance when the outer layer or flexible support structure is loaded with the weight of a person using the pad. In the examples employing gel, some or all of the gel is exposed on a surface of the resilient layer such that there is no intervening layer between the exposed portions of the gel and a surface on which the pad is being used. In use, protruding objects may displace the gel as the objects extend into the cavities or cells and, when the objects are extracted from the gel (e.g., the pad is lifted off a surface) any cavities or holes formed by the displacement of the gel are filled as the gel flows back into those cavities or holes.

In examples described herein, the resilient layer may also be coupled to a puncture-resistant, shielding or barrier layer that is made of a material that is capable of preventing objects from penetrating therethrough under normal use. For example, the puncture-resistant, shielding or barrier layer may be made of a hard plastic material, a metallic material, a hard (i.e., a relatively high durometer) rubber or elastomeric material, a composite material, a woven material, or any other suitable material or combination of materials.

To further increase the comfort of persons using the example pads described herein, a cushioning layer may be coupled to the puncture-resistant layer such that the cushioning layer is adjacent the person when the pad is in use. The cushioning layer may be implemented using closed or open cell foam, a gel, a relatively low durometer elastomer, or any other material or combination of materials that conform easily to a person (e.g. a knee or shin) to increase the comfort of the person using the example pads.

FIG. 1 is a side view of an example pad 110 described herein. In the illustrated example of FIG. 1, the pad 110 includes a first layer 112, a second layer 114 coupled to the first layer 112, and a third or outer layer 116 coupled to the second layer 114 such that the second layer 114 is sandwiched between the first layer 112 and the third layer 116. In general, the first layer 112 is configured to provide a comfortable cushioning surface against which a person's knee, shin and/or other body part may bear during use of the pad 110. Accordingly, the first layer 112 may be referred to as a cushioning layer. The second layer 114 is configured to provide a protective barrier or shielding layer that is resistant to puncture by objects (e.g., fasteners) that may be protruding from a surface on which the pad 110 is being used. Accordingly, the second layer 114 may be referred to as a shielding layer or a puncture-resistant layer. The third layer 116 is configured to resiliently contact the surface on which the pad 110 is being used and to conform to any uneven characteristics of the surface, thereby isolating the person using the pad 110 from those characteristics and increasing the comfort of the person using the pad 110. Accordingly, the third layer 116 may be referred to as a resilient layer.

Additionally, the third layer 116 is further configured to support the person using the pad 110 at a distance above (i.e., standoff the person from) the surface on which the pad 110 is being used and to provide cavities or spaces within the third layer 116 that can receive objects (e.g., fasteners) that may be protruding from the surface on which the pad 110 is being used. The standoff distance and, thus, the depths of the cavities or spaces of the third layer 116, are sufficient to prevent the protruding objects from contacting or penetrating the second layer 114. As such, the person using the pad 110 is isolated from any uneven characteristics of the surface on which the pad 110 is being used and is further isolated from any protruding objects, thereby significantly increasing the comfort and safety of the person using the pad 110. Additionally, little, if any, of the weight of a person using the pad 110 is not be imparted to protruding objects that are received by the cavities or spaces of the third layer 116 due to the standoff support provided by the third layer 116. As such, the protruding objects are not deformed or otherwise damaged as a result of a person kneeling on or crawling over such objects while using the pad 110. For example, in a situation where a person is kneeling on panels held together by temporary fasteners (e.g., welding panels held together by CLECO® fasteners), preventing damage (e.g., deformation) of these fasteners greatly simplifies removal and/or reuse of these fasteners.

Figure 2:
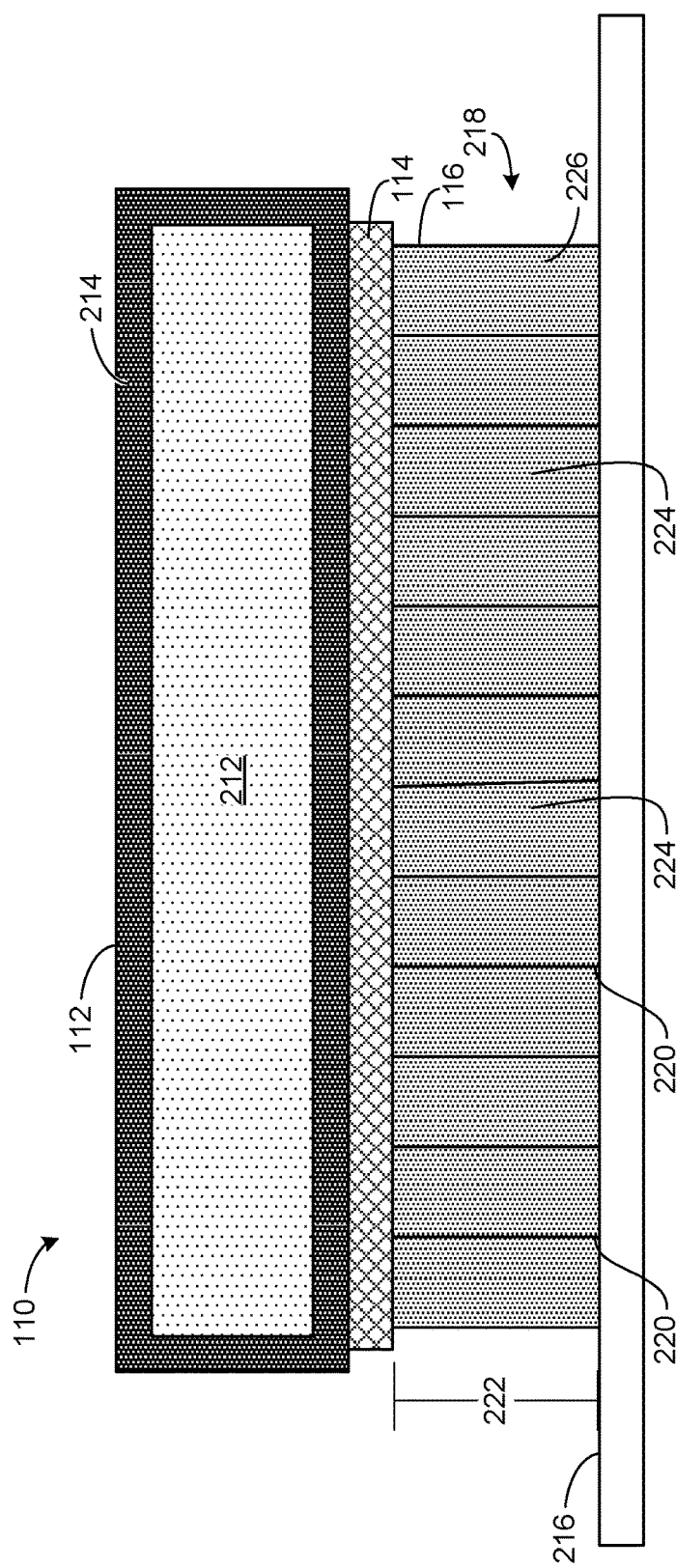
FIG. 2 is a cross-sectional view of an example implementation of the pad of FIG. 1.

FIG. 2 is a cross-sectional view of the example pad 110 of FIG. 1. In the illustrated example of FIG. 2, the first layer 112 includes a resilient core 212 and an outer skin 214. In some examples, the resilient core 212 is composed of foam (e.g., EVA, PEVA, etc.) and the outer skin 214 is an elastomer (e.g., rubber, rubberized plastic, vinyl, etc.) that encapsulates or covers the resilient core 212. The outer skin 214 protects (e.g., seals) the resilient core 212 from wear/abrasion, tearing, contamination with liquids and solids (e.g., oils, grease, water, solvents, dirt, etc.), and/or any other conditions that may reduce the useful lifespan of the resilient core 212. In some examples, to reduce the overall weight of the example pad 110, the outer skin 214 covers only a portion of the resilient core 212, leaving other portions of the resilient core 212 exposed. In other examples, the material selected for the resilient core 212 may be relatively impervious to damage, wear and/or contamination and, thus, in those examples, the outer skin 214 may be fully or partially omitted.

The second layer 114 may be coupled (e.g., adhered, bonded, glued, etc.) to the first layer 112 with an adhesive (e.g., polyamide, cyano-acrylate, phenolic, epoxy, etc.) and/or other mechanical fastening techniques. The second layer 114 is composed of a puncture-resistant material (e.g., woven para-aramid fibers, KEVLAR®, TECHNORA®, TWARON®, HERACRON®, metallic mesh, chain mail, metallic plates, ceramic plates, etc.) to prevent objects protruding from a surface 216 on which the pad 110 is being used from penetrating the second layer 114 and contacting the person using the pad 110.

As can be seen in FIG. 2, the third or outer layer 116 includes a flexible support structure 218 that extends away from the second layer 114 toward the surface 216 on which the pad 110 is being used. Ends 220 of the flexible support structure 218 contact the surface 216 and the flexible support structure 218 is sufficiently resilient to conform to a shape of the surface 216 while supporting (e.g., standing off) a person using the pad 110 a distance 222 (e.g., a standoff depth) above the surface 216. In this manner the person using the pad 110 is isolated from any uneven characteristics of the surface 216, thereby significantly increasing the comfort of the person using the pad 110. The flexible support structure 218 defines spaces or cavities 224 between portions (e.g., walls, posts, fingers, etc.) of the flexible support structure 218. As described in greater detail in connection with FIG. 6 below, these spaces or cavities 224 are configured to receive objects that may be protruding from the surface 216. More specifically, the distance 222 enables the spaces or cavities 224 to have sufficient depth to receive protruding objects in a manner to prevent the protruding objects from contacting and/or penetrating the second layer 114, thereby isolating the person using the pad 110 from these protruding objects. Such isolation can further increase the comfort and safety of the person using the pad 110.

In some examples, the flexible support structure 218 may be configured to include posts or finger-like projections. In other examples, the flexible support structure 218 may be configured to include relatively thin wall-shaped structures. In still other examples, the flexible support structure 218 may be configured to include interlinked or interconnected walls that form a matrix of cells (e.g., spaces, cavities, openings) between the walls. In yet other examples, the flexible support structure 218 may be a unitary wall-shaped structure that extends about a perimeter of the pad 110. Regardless of the specific shape or geometry of the flexible support structure 218, the flexible support structure 218 is configured to be displaceable, resilient, springy, pliable, elastic, etc. Thus, in some examples, the flexible support structure 218 is made of a resilient elastomer.

As shown in FIG. 2, the example pad 110 may optionally include a flowable or self-healing gel 226 (e.g., a polymer hydrogel) disposed in the spaces or cavities 224 between portions of the flexible support structure 218. The gel 226 may be bonded to the flexible support structure 218 (e.g., cell walls in the case where the flexible support structure 218 forms an elastomeric matrix of cells) via a dual-shot extrusion process in which the flexible support structure 218 is formed together with the gel 226. In other words, using a dual-shot process, the flexible support structure 218 and the gel 226 may be molded simultaneously. Alternatively, the gel 226 may be deposited in the spaces or cavities 224 between portions of the flexible support structure 218 after the flexible support structure 218 has been formed. For example, the gel 226 may be injected, poured, scooped, etc., into the spaces or cavities 224.

Regardless of how the gel 226 is provided to the spaces or cavities 224 between the portions of the flexible support structure 218, the gel 226 and the portions of the flexible support structure 218 cooperate to define the overall resiliency of the third layer 116. For example, the gel 226 provides hydraulic support to the portions (e.g., walls) of the flexible support structure 218. As a result, the use of the gel 226 may permit the number and thickness of the portions of the flexible support structure (e.g., wall thickness) to be reduced as compared to examples that do not include the gel 226. Reducing the number and/or thickness of the portions of the flexible support structure 218 reduces the likelihood that an object protruding from the surface 216 contacts the flexible support structure 218 and increases the likelihood that an object protruding from the surface 216 is isolated via one of the spaces or cavities 224 between the portions of the flexible support structure 218. As shown in FIG. 2, the gel 226 is exposed to the surface 216 on which the pad 110 is being used (e.g., the gel 226 is not covered on the bottom of the pad 110). Thus, there is no intervening layer between the gel 226 and the surface 216. As a result, any objects protruding from the surface 216 can freely penetrate and displace the gel 226 in the spaces or cavities 224 between the portions of the flexible support structure 218 without damaging the pad 110.

Figure 3:
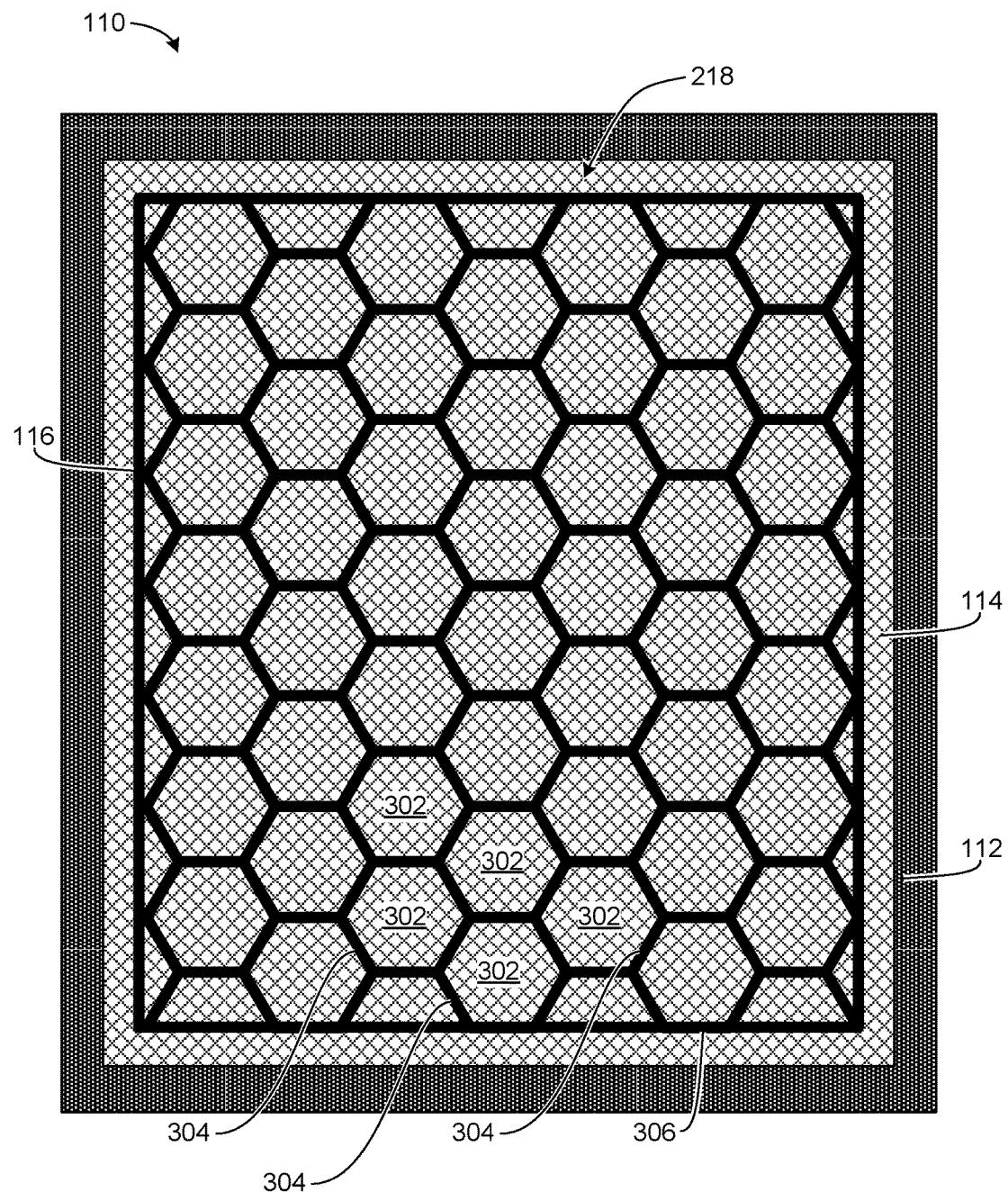
FIG. 3 is a bottom view of an example implementation of the pad of FIGS. 1 and 2.
Figure 4:
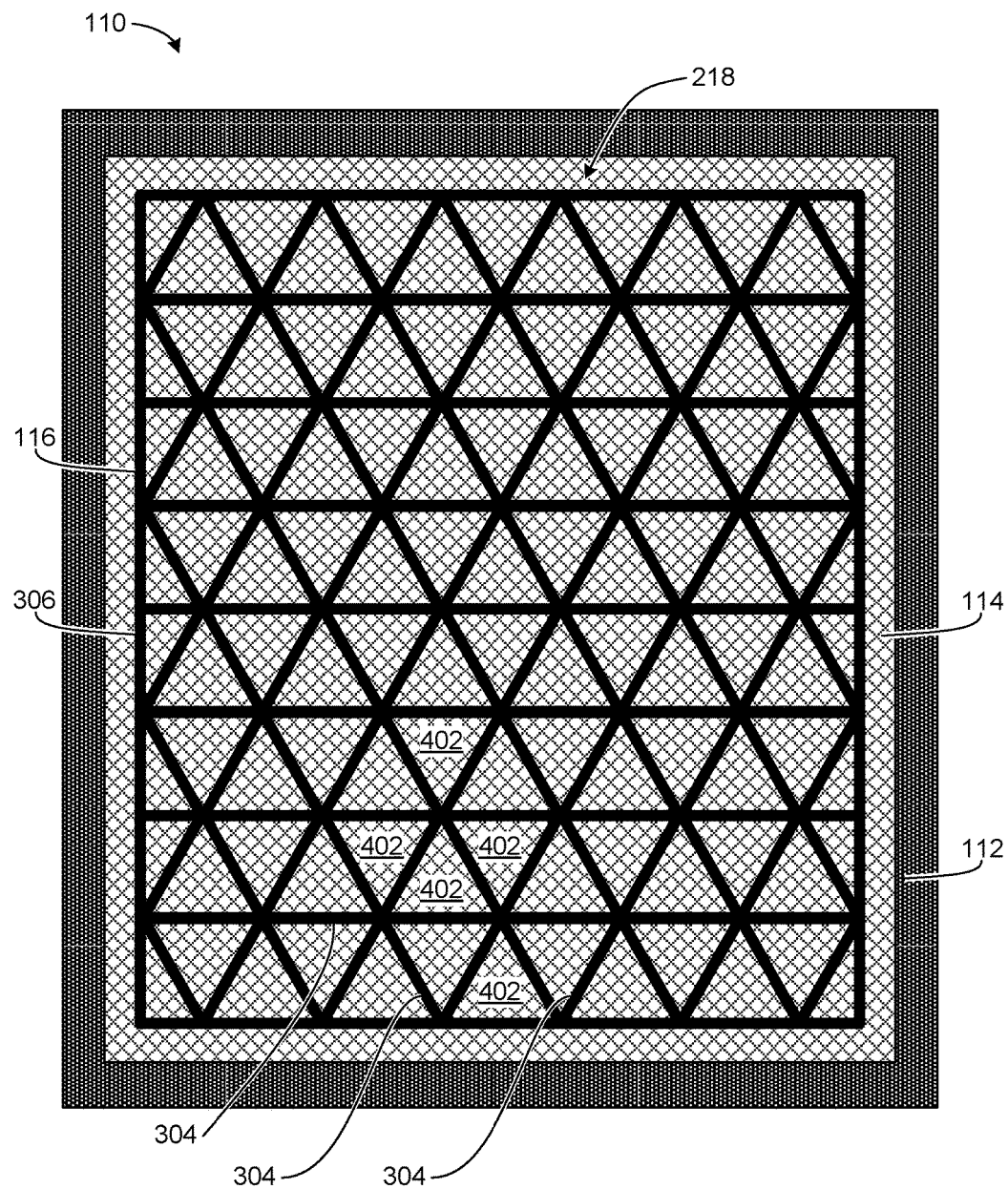
FIG. 4 is a bottom view of an alternative example implementation of the pad of FIGS. 1 and 2.
Figure 5:
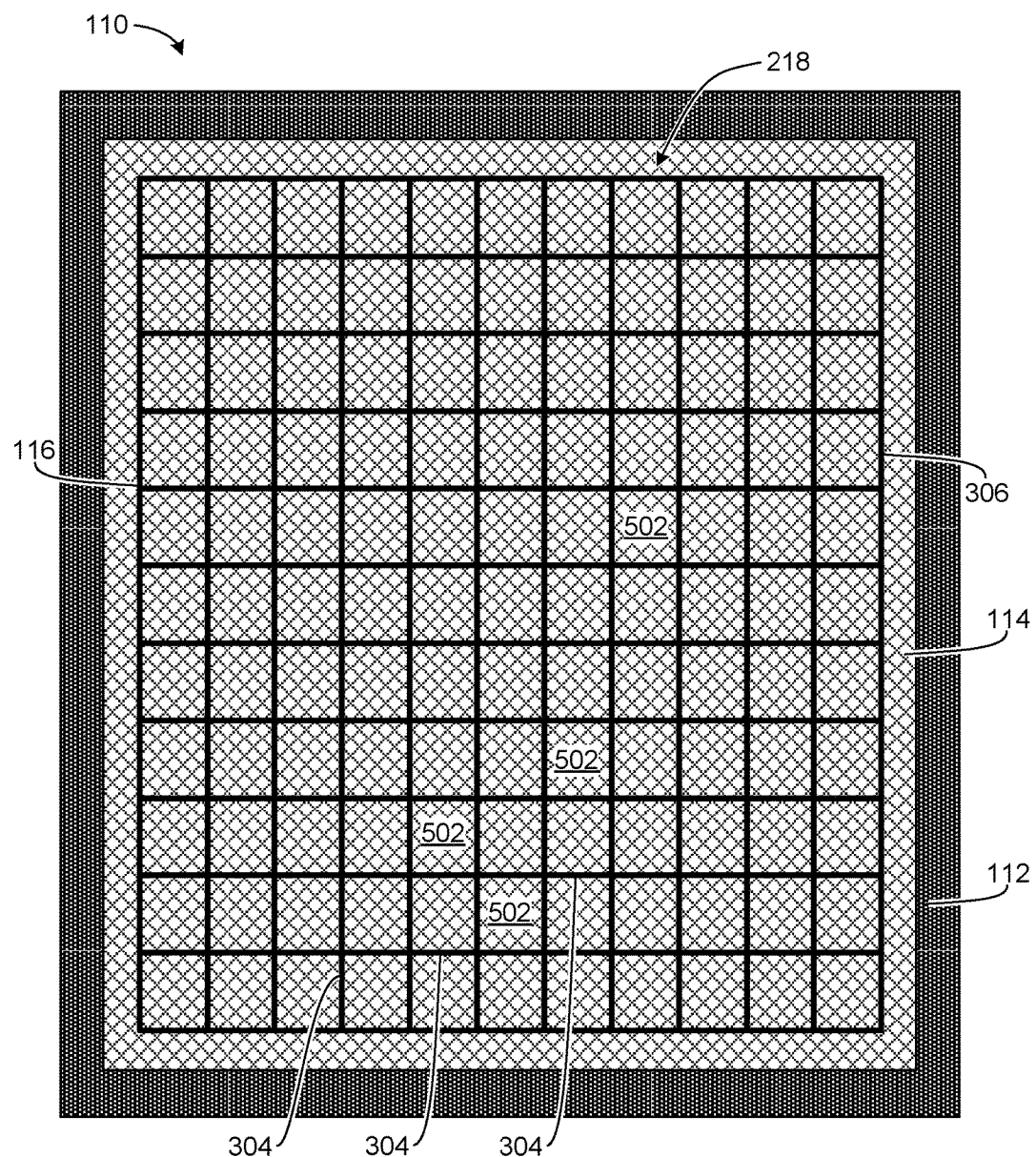
FIG. 5 is a bottom view of another alternative example implementation of the pad of FIGS. 1 and 2.

FIGS. 3, 4, and 5 depict bottom views of different example implementations of the flexible support structure 218 and, more generally, the third layer 116 of the example pad 110. The examples of FIGS. 3, 4, and 5 employ flexible support structures 218 that are formed with interlinked walls that define differently shaped matrices of cells. In the examples of FIGS. 3, 4, and 5, the gel 226 shown in FIG. 2 is not present. However, any of these examples could be used with the gel 226 as described above in connection with the example of FIG. 2.

Turning to FIG. 3, the third layer 116 includes a flexible support structure 218 that forms a matrix of hexagonal cells 302 (e.g., honeycomb structure) defined by cell walls 304. The flexible support structure 218 includes a perimeter wall 306 that bounds (e.g., encircles, surrounds, etc.) the cells 302 defined by the cell walls 304. As shown in FIG. 3, some of the cells 302 of the flexible support structure 218 may be defined by the cell walls 304 and the perimeter wall 306. In FIG. 4, the third layer 116 includes a flexible support structure 218 that forms a matrix of triangularly-shaped cells (e.g., a divided honeycomb) 402. In FIG. 5, the third layer 116 includes a flexible support structure 218 that forms a matrix of cells 502 arranged in a quadrilateral (e.g., square, rectangular, parallelogram, rectilinear, etc.) pattern.

FIG. 6 is a cross-sectional view of the example pad 110 of FIG. 1 in use. As shown in FIG. 6, the first layer 112 of the pad 110 is in contact with a knee and shin area 602 of a person's leg 604. Thus, in this example, the pad 110 is being used as a knee pad. However, the example pads described herein may be used in connection with other portions of a person's body to provide increased comfort and safety. As is also shown in FIG. 6, the third layer 116 of the example pad 110 is in contact with a surface 606 that has an uneven characteristic 608 and fasteners 610 protruding therefrom. In this example, the surface 606 on which the pad 110 is being used is two overlapping plates 612, 614 (e.g., metallic plates) that are temporarily held together via the fasteners 610 to facilitate permanent fastening (e.g., welding) of the plates 612, 614.

As can be seen in FIG. 6, the weight of the person using the pad 110 has caused the flexible support structure 218 of the third layer 116 to conform to the uneven characteristic 608 of the surface 606 in a manner that isolates the person from the uneven characteristic 608. As a result, the person may not experience discomfort as a result of kneeling on the uneven characteristic 608. Further, as can been seen in FIG. 6, the protruding fasteners 610 have penetrated into the cavities or spaces 224 of the flexible support structure 218, thereby displacing the gel 226 contained therein. Thus, the pad 110 supports the person's leg 604 above the surface 606 in a manner that prevents the protruding fasteners 610 from penetrating the second layer 114 and, thus, isolates the person's leg 604 from contact with the fasteners 610 to provide safety and comfort to the person using the pad 110. Additionally, the fasteners 610 are protected from damage because the weight of the person using the pad 110 does not bear on the fasteners 610. Rather, the person's weight is distributed over the surface 606 via the third layer 116. Generally, the resiliency of the flexible support structure 218 and the depths of the cavities or spaces 224 of the flexible support structure 218 are sufficient to prevent protruding objects (e.g., the fasteners 610) from contacting the second layer 114. However, even if a protruding object does contact the second layer 114 (as shown in connection with the leftmost one of the fasteners 610), such contact is of insufficient force to penetrate the second layer 114 or damage the fastener 610 because much of the person's weight had been distributed across the surface by the flexible support structure 218 at the point such contact occurs.

When the pad 110 is moved away from the surface 606 to be repositioned, the protruding fasteners 610 are extracted from the spaces or cavities 224 and the gel 226. Any holes or cavities formed in the gel 226 by the protruding fasteners 610 are then filled as the gel 226 flows back into these holes or cavities. Also, any deformation (e.g., conformance) of the flexible support structure 218 to any uneven characteristics (e.g., the uneven characteristic 608) of the surface 606 can be eliminated as the flexible support structure 218 resiliently returns to an undeformed state, thereby enabling continued use of the pad 110 on various surfaces.

From the foregoing, it will be appreciated that the above disclosed methods, apparatus and articles of manufacture may provide protective pads that are ergonomic and resistant to protruding objects, thus increasing comfort for workers as well as preventing damage to fasteners, particularly reusable fasteners. Prevention of damage to fasteners may mitigate costs associated with replacement fasteners. Furthermore, utilizing the ergonomic puncture-resistant pads to increase comfort may increase worker efficiency and/or productivity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pad configured to be worn by a person, the pad comprising:
   a first layer configured to be adjacent the person and to conform to the person;
   a second layer coupled to the first layer, the second layer configured to resist puncture; and
   a third layer coupled to the second layer, the third layer including a flexible support structure extending from the second layer in a direction away from the person, the third layer configured to support the person and to conform to a shape of a surface supporting the person, the flexible support structure configured to contact the surface, the flexible support structure including a matrix of cells defined by interlinked cell walls, the cells defining cavities to receive at least one object protruding from the surface to isolate the person from the at least one protruding object.

2. The pad of claim 1, further including a gel disposed in each of the cells, the gel configured to receive the at least one object protruding from the surface.

3. The pad of claim 2, wherein the gel is exposed to contact the surface.

4. The pad of claim 2, wherein the gel provides hydraulic support to the interlinked cell walls.

5. The pad of claim 1, wherein the second layer is a woven material.

6. The pad of claim 5, wherein the woven material includes para-aramid fibers.

7. The pad of claim 1, wherein the matrix of cells defines a hexagonal pattern, a triangular pattern, or a quadrilateral pattern.

8. The pad of claim 1, wherein the flexible support structure provides a standoff distance between the second layer and the surface.

9. A pad configured to be worn by a person, the pad comprising:
   an outer resilient layer configured to face toward a surface supporting the person using the pad, the outer resilient layer including a gel configured to receive at least one object protruding from the surface, the gel exposed on the outer resilient layer without an intervening layer between the gel and the surface.

10. The pad of claim 9, wherein the outer resilient layer includes a matrix of cells defined by interlinked cell walls, the cells defining cavities to receive the at least one object to isolate the person from the at least one object, the gel being disposed in the cells.

11. The pad of claim 10, further including a shielding layer coupled to the outer resilient layer to prevent the at least one object from contacting the person, the shielding layer configured to resist puncture.

12. The pad of claim 11, wherein the shielding layer includes para-aramid fibers.

13. The pad of claim 12, further including a cushioning layer coupled to the shielding layer, the cushioning layer configured to conform to the person.

14. The pad of claim 10, wherein the matrix of cells defines a hexagonal pattern, a triangular pattern, or a quadrilateral pattern.

15. The pad of claim 10, wherein the gel provides hydraulic support to the interlinked cell walls.

16. The pad of claim 9, wherein the gel is configured to displace to receive the at least one object and to flow to fill a cavity formed upon extraction of the at least one object from the gel.

17. A method for making a knee pad to be worn by a person, the method comprising:
   coupling an outer resilient layer to a shielding layer, the shielding layer configured to resist puncture, the outer resilient layer configured to face toward a surface supporting the person using the pad, the outer resilient layer including a matrix of cells defined by interlinked cell walls, the cells defining cavities configured to receive at least one object protruding from the surface to isolate the person from the at least one object; and
   coupling a cushioning layer to the shielding layer, the cushioning layer configured to conform to the person.

18. The method of claim 17, further comprising disposing a gel in the cells, the gel configured to receive the at least one object protruding from the surface.

19. The method of claim 18, wherein disposing the gel in the cells includes bonding the gel to the interlinked cell walls.

20. The pad of claim 18, wherein the gel provides hydraulic support to the interlinked cell walls.

* * * * *